US011862016B1

(12) United States Patent
Cai et al.

(10) Patent No.: US 11,862,016 B1
(45) Date of Patent: Jan. 2, 2024

(54) MULTI-INTELLIGENCE FEDERAL REINFORCEMENT LEARNING-BASED VEHICLE-ROAD COOPERATIVE CONTROL SYSTEM AND METHOD AT COMPLEX INTERSECTION

(71) Applicant: JIANGSU UNIVERSITY, Zhenjiang (CN)

(72) Inventors: Yingfeng Cai, Zhenjiang (CN); Sikai Lu, Zhenjiang (CN); Long Chen, Zhenjiang (CN); Hai Wang, Zhenjiang (CN); Chaochun Yuan, Zhenjiang (CN); Qingchao Liu, Zhenjiang (CN); Yicheng Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/026,835

(22) PCT Filed: Aug. 4, 2022

(86) PCT No.: PCT/CN2022/110197

§ 371 (c)(1),
(2) Date: Mar. 17, 2023

(30) Foreign Application Priority Data

Jul. 19, 2022 (CN) ........................ 202210845539.1

(51) Int. Cl.
*G08G 1/08* (2006.01)

(52) U.S. Cl.
CPC .................................... *G08G 1/08* (2013.01)

(58) Field of Classification Search
CPC ...................................................... G08G 1/08
(Continued)

(56) References Cited

U.S. PATENT DOCUMENTS 11,305,775 B2 * 4/2022 Yu ........................ G06V 20/588
2019/0050729 A1 * 2/2019 Lakshmanan .......... G06N 3/063
(Continued)

FOREIGN PATENT DOCUMENTS

CN 112465151 A 3/2021
CN 113743468 A 12/2021
(Continued)

*Primary Examiner* — Atul Trivedi
(74) *Attorney, Agent, or Firm* — Bayramoglu Law Offices LLC

(57) ABSTRACT

A multi-intelligence federated reinforcement learning (FRL)-based vehicle-road cooperative control system and method at the complex intersection use a vehicle-road cooperative control framework based on the Road Side Unit (RSU) static processing module and the vehicle-based dynamic processing module. The historical road information is supplied by the proposed RSU module. The Federated Twin Delayed Deep Deterministic policy gradient (FTD3) algorithm is proposed to connect the federated learning (FL) module and the reinforcement learning (RL) module. The FTD3 algorithm transmits only neural network parameters instead of vehicle samples to protect privacy. Firstly, FTD3 selects only specific networks for aggregation to reduce the communication cost. Secondly, FTD3 realizes the deep combination of FL and RL by aggregating target critic networks with smaller Q-values. Thirdly, RSU neural network participates in aggregation rather than training, and only shared global model parameters are used.

5 Claims, 4 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 2020/0111005 | A1* | 4/2020 | Ghosh | G06N 3/042 |
| 2020/0117916 | A1* | 4/2020 | Liu | G05D 1/0221 |
| 2020/0150672 | A1* | 5/2020 | Naghshvar | G06N 3/006 |
| 2020/0249674 | A1* | 8/2020 | Dally | G05D 1/0088 |
| 2020/0293796 | A1* | 9/2020 | Sajjadi Mohammadabadi | G06V 10/751 |
| 2021/0089040 | A1* | 3/2021 | Ebrahimi Afrouzi | G05D 1/0248 |
| 2021/0133670 | A1* | 5/2021 | Cella | G06N 3/044 |
| 2021/0223780 | A1* | 7/2021 | Bramley | G06V 10/82 |
| 2022/0036302 | A1* | 2/2022 | Cella | G06Q 10/0834 |
| 2022/0126831 | A1* | 4/2022 | Foil | G08G 1/16 |
| 2022/0187841 | A1* | 6/2022 | Ebrahimi Afrouzi | G05D 1/0242 |
| 2022/0196414 | A1 | 6/2022 | Wang et al. | |

FOREIGN PATENT DOCUMENTS

| | | | | |
|---|---|---|---|---|
| CN | 114463997 | A | 5/2022 | |
| WO | WO-2020256764 | A1 * | 12/2020 | B60W 40/08 |
| WO | WO-2021222384 | A1 * | 11/2021 | G06F 30/20 |

* cited by examiner

MULTI-INTELLIGENCE FEDERAL REINFORCEMENT LEARNING-BASED VEHICLE-ROAD COOPERATIVE CONTROL SYSTEM AND METHOD AT COMPLEX INTERSECTION

CROSS REFERENCE TO THE RELATED APPLICATIONS

This application is the national phase entry of International Application No. PCT/CN2022/110197, filed on Aug. 4, 2022, which is based upon and claims priority to Chinese Patent Application No. 202210845539.1, filed on Jul. 19, 2022, the entire contents of which are incorporated herein by reference.

TECHNICAL FIELD

The present disclosure belongs to the field of transportation, and relates to a multi-intelligence federated reinforcement learning-based vehicle-road cooperative control system at a complex intersection.

BACKGROUND

In recent years, the topic of autonomous vehicles has attracted a significant number of research interests from a wide variety of research communities. During the studies, the intelligence of a single vehicle has certain limitations, while in complex traffic situations, its limited perception range and computational power may affect decision-making. One approach is to blindly upgrade hardware devices to improve single vehicle performance, but this is not a fundamental solution. However, vehicle-road cooperative sensing and transferring the computational load are more realistic options. The vehicle-road cooperation technology is to install perception sensors on the RSU and provide data to the vehicle after calculation. The technology supports the vehicle to complete automatic driving by reducing the burden of single vehicle. However, complicated traffic conditions and redundant traffic information may cause problems at the current stage of vehicle-road cooperation technology. Including difficulties in extracting effective information, high communication overhead and raise difficulties in achieving the desired control effect. In addition, the information asymmetry caused by privacy awareness becomes a bottleneck in vehicle-road cooperation.

Federated learning (FL) is a distributed cooperative approach that allows multiple partners to train data independently and build shared models, providing a safer learning environment and cooperative process through special learning architectures and communication principles that protect the privacy of the vehicle. When faced with complex driving environments, FL optimizes the control strategy of the vehicle and reflects altruism while maintaining safety by setting a compound reward function and repeated trial-and-error training procedures. FRL is a combination of FL and RL. FRL uses the distributed multi-intelligence training framework of FL for cooperative training. It protects privacy and significantly reduces communication overhead by transmitting only network parameters instead of training data. FRL shows great potential in the field of automated driving by combining the trial-and-error training method of RL with FL. FRL has strict network aggregation requirements, and the two algorithms show incompatibility in the situation of multiple networks, resulting in unstable network convergence, poor training effect, and huge network overhead.

SUMMARY

To solve the above technical problems, the present disclosure provides a vehicle-road cooperative control system based on multi-intelligence FRL at the complex intersection. The system guides the training through the RSU advantage and realizes the cooperative sensing, training and evaluation at the same time. By using the system, the cooperative vehicle-road control is implemented in practice. In addition, the proposed FTD3 algorithm improves the algorithm from multiple perspectives of the combination of FL and RL, accelerating the convergence, improving the convergence level, and reducing the communication consumption, while protecting the privacy of the autonomous vehicle.

In the present patent, the technical solution of the multi-intelligence federation reinforcement learning-based vehicle-road cooperative control system consists of two main blocks: First, the vehicle-road cooperative framework includes the RSU static processing module, the simulation environment and sensors, and the vehicle-based dynamic processing module. Second, the FTD3 algorithm includes the RL module and the FL module.

For the vehicle-road cooperative framework, the main purpose is to synthesize the cooperative state matrix for training. The RSU static processing module is used to obtain static road information, and separate lane centerline information from it as a static matrix and transmit it to the vehicle-based dynamic processing module.

The described CARLA simulation environment is used for the intelligent agents to interact with the environment, while the sensors are used to obtain the vehicle dynamic states, as well as collision and lane invasion events. The GNSS sensor receives the vehicle location data, while the velocity information is retrieved by evaluating the transposition/rotation between two consecutive frames. The Inertial Measurement Unit (IMU) sensor obtains information from the vehicle's acceleration and orientation. The specific interaction process is that the sensors are used to capture the states of the agents, then the neural network outputs the control quantity according to the states, and finally, the control quantity is passed to the CARLA simulation environment for execution.

The described vehicle-based dynamic processing module is used to synthesize the cooperative state matrix information. The static matrix obtained by the RSU static processing module is cut into a 56×56 matrix according to the vehicle location information. Then, the matrix and sensor information of two consecutive frames are stacked to synthesize the cooperative state matrix, and the cooperative state matrix is transmitted to the RL module.

For the FTD3 algorithm, the main purpose is to output the control quantity according to the cooperative state matrix. The RL module is used for the output control strategy and is described by a Markov decision process. In the Markov decision process, the state of the next moment is only related to the current state and has nothing to do with the previous state. The state sequence Markov chain formed under this premise is the basis of the RL module of the present disclosure. The RL module consists of three small modules: a neural network module, a reward function module, and a network training module.

The neural network module is used to extract the features of the input cooperative state matrix and output the control quantity according to the features. As a result, the control quantity is executed by the simulation environment. In addition to the actor network and two critic networks of the traditional TD3 algorithm, the FTD3 agents also have the target networks. The six neural network structures use one convolutional layer and four fully connected layers to extract and integrate features, and are identical except for the output layer. Using the activation function tanh, the outputs of the actor network are mapped to [−1, 1], respectively. As shown in FIG. 1, $a_{t1}$ represents the steering wheel control matrix in the CARLA simulator, and $a_{t2}$ is split into [−1, 0], [0, 1], representing the brake and throttle control matrices, respectively. For the critic network, the output layer does not use the activation function and outputs the evaluation value directly.

The reward function module judges the output value of the neural network module based on the new state achieved after performing the action and guides the network training module for learning. The reward function is set based on both lateral distance-related reward function considerations and longitudinal speed-related reward function considerations:

$$r=r_{lateral}+r_{longitudinal}$$

The first one is the lateral reward function setting:

$$r1_{lateral}=-\log_{1.1}(|d0|+1)$$

$$r2_{lateral}=-10*|\sin(\text{radians}(\theta))|$$

$$r_{lateral}=r1_{lateral}+r2_{lateral}$$

Where, $r1_{lateral}$ denotes the lateral error related reward function, $r2_{lateral}$ is the heading angle deviation related reward function. The second is the longitudinal reward function setting:

$$x=\begin{cases}\frac{d_{min}}{v_{ego}}, & \text{if } d_{min}\le 14\\ 1, & \text{if } d_{min}>14\end{cases}$$

$$r1_{longitudinal}=-5+\sqrt{5^2(1-(x-1)^2)}$$

$$r2_{longitudinal}=-|v_{ego}-9|$$

$$r_{longitudinal}=r1_{longitudinal}+r2_{longitudinal}$$

Where, $r1_{longitudinal}$ denotes the distance related reward function, $r2_{longitudinal}$ denotes the longitudinal speed related reward function, d0 represents the minimum distance from the self-vehicle to the centerline of the lane, θ is the deviation of the heading angle of the self-vehicle, $d_{min}$ defines the minimum distance from the self-vehicle to the other vehicle, and $v_{ego}$ is the speed of the self-vehicle at the current moment. d0 and $d_{min}$ are calculated from the Euclidean distances of the elements in the matrix:

$$d0=\min(\|a_{28,28}-b_{center\ line}\|^2)$$

$$d_{min}=\min(\|a_{28,28}-b_{x,y}\|^2)$$

Where, $a_{28,28}$ denotes the own position of gravity center in the matrix, $b_{center\ line}$ defines the lane centerline position in the cooperative perception matrix and $b_{x,y}$ shows the other vehicle gravity positions in the cooperative perception matrix.

The network training module is mainly used to train the neural network according to the set method. According to the guidance of the reward function module, the actor network and the critic network update the parameters by backpropagation, and all the target networks update the parameters by soft update, and find the optimal solution to maximize the cumulative reward under a certain state.

Following the procedure for learning and updating: First, sample from the replay buffer according to minibatch and compute y as follow:

$$\tilde{a}\leftarrow\pi_{\theta^{\mu'}}(s')+\epsilon,\epsilon\sim\text{clip}(\mathcal{N}(0,\tilde{\sigma}),-c,c)$$

$$y\leftarrow r+\gamma\min_{l=1,2}Q_{\theta'_l}(s',\tilde{a})$$

Where, $\pi_{\theta^{\mu'}}(s')$ denotes the strategy of target actor network, $\epsilon\sim\text{clip}(\mathcal{N}(0,\tilde{\sigma}),-c,c)$ represents the normal distribution noise between constants −c and c, ã is the action output after noise, r defines the instant reward, γ is the discount factor, $$\min_{l=1,2}Q_{\theta'_l}(s',\tilde{a})$$

denotes the smaller value obtained by executing action ã, ã denotes the output of the target actor network $\mu'(s'|\theta^{\nu'})$ under the state s', $\theta^{\mu'}$ denotes the parameter of target actor network, $\theta'_l$ denotes the parameter of target critic networks.

The Critic network is then updated by minimizing the loss:

$$\theta_l\leftarrow\underset{\theta_l}{\text{argmin}}\frac{1}{N}\sum(y-Q_{\theta_l}(s,a))^2$$

Where, N represents the minibatch size, y is the target, $Q_{\theta_l}(s, a)$ denotes the value obtained by executing action a, a denotes the output of the strategy π under the state s, $\theta_l$ denotes the parameter of critic network. After a certain delay, the actor network is updated using the deterministic policy gradient.

$$\nabla_{\theta^\mu}J(\theta^\mu)=\frac{1}{N}\sum\nabla_aQ_{\theta_1}(s,a)\Big|_{a=\pi_{\theta^\mu}(s)}\nabla_{\theta^\mu}\pi_{\theta^\mu}(s)$$

Where, N denotes the minibatch size, $\nabla_aQ_{\theta_1}(s, a)$ denotes the partial derivative of $Q_{\theta_1}(s, a)$ to a, $\nabla_{\theta^\mu}\pi_{\theta^\mu}(s)$ defines the partial derivative of $\pi_{\theta^\mu}(s)$ to $\theta^\mu$, $\pi_{\theta^\mu}(s)$ is the actor network, $\theta^\mu$ denotes the parameter of actor network. Finally, using a soft update, the target network is updated as follows:

$$\theta'_l\leftarrow\tau\theta_l+(1-\tau)\theta'_l$$

$$\theta^{\mu'}\leftarrow\tau\theta^\mu+(1-\tau)\theta^{\mu'}$$

Where, τ denotes the soft update parameter.

The FL module is mainly used to obtain the neural network parameters trained by the network training module to aggregate the shared model parameters and to distribute the shared model parameters to the agents for local updating. The FL module consists of two small modules: a network parameter module and a aggregation module.

The network parameter module is used to obtain the neural network parameters before aggregation, and then uploads the parameters to the aggregation module for aggregation of shared model parameters; then the aggregation module is used to obtain the shared model parameters and distribute the parameters to the agents for local update.

The aggregation module aggregates the shared model parameters by averaging the neural network parameters uploaded by the network parameter module according to the aggregation interval:

$$\theta^* = \frac{1}{n}\sum_{i=0}^{n}\theta_i$$

Where, $\theta_i$ is the neural network if agent i, n denotes the number of neural networks, $\theta^*$ represents the shared model parameter after aggregation.

In general, the FTD3 algorithm is used to connect the RL module to the FL module. The algorithm transmits only neural network parameters instead of vehicle data to protect privacy. Only specific neural networks that produce smaller Q-values are selected to participate in the aggregation to reduce their respective consumption and prevent overestimation.

The technical solution of the vehicle-road cooperative control method of the present disclosure based on multi-intelligence FRL includes the following steps:

Step 1. The vehicle-road cooperative framework is constructed in the simulation environment. In the framework, the RSU static processing module and the vehicle-based dynamic processing module are used to synthesize the cooperative state matrix for RL. The information is distinguished into static information (road, lane, lane centerline) and dynamic information (intelligent connected vehicles) by using the RSU static processing module. Specifically, the extracted static information, lane centerline, is used as the basis for the RL cooperative state matrix. While the dynamic information will be used as the basis for state matrix cropping. The proposed vehicle-based dynamic processing module is used to crop the static matrix obtained by the RSU static processing module, based on the vehicle location information and coordinate transformation. The cropped 56×56 matrix is then used as the sensing area of a single vehicle, covering a physical space of about 14 m×14 m. The dynamic information is stacked in two consecutive frames to obtain more comprehensive dynamic information. Then, the dynamic processing module is used to superimpose the cropped static matrix and the stacked dynamic information to synthesize the cooperative state matrix for FTD3.

Step 2. The control method is described as a Markov decision process. The Markov decision process consists of tuples (S, A, P, R, $\gamma$) description, where:

S denotes the state set. In the present disclosure, the cooperative state matrix consists of two matrices. First, the cooperative perception matrix obtained by the proposed vehicle-based dynamic processing module. In addition to static road information, dynamic vehicle speed, and location information, the matrix also includes implicit information such as vehicle acceleration distance from the lane centerline, direction of travel, and heading angle deviation. Convolutional layers and fully connected layers are used to integrate the features. Second, the current sensor information matrix includes the speed, orientation, and acceleration information obtained and computed by the vehicle sensors;

A is the action set, corresponding to the vehicle's throttle and steering wheel control quantity;

P denotes the state transition equation P: S×A→P(S). For each state-action pair (s, a)∈S×A, there is a probability distribution p (•|s, a) indicating the possibility of entering a new state after action a is taken under the state s;

R defines the reward function R: S×S×A→R. R($s_{t+1}$, $s_t$, $a_t$) denotes the reward obtained after moving from the original state $s_t$ to the new state $s_{t+1}$. In the present disclosure, the reward function is used to evaluate the performance of the action;

$\gamma$ represents the discount factor, $\gamma\in[0, 1]$, used to compute the cumulative reward function $\eta(\pi_\theta)=\Sigma_{i=0}^{T}\gamma^i r_i$.

The solution to the Markov decision process is to find a strategy $\pi$: S→A, to maximizes the discounted reward $\pi^*:=\mathrm{argmax}_\theta\eta(\pi_\theta)$. In the present disclosure, the cooperative state matrices obtained by the vehicle-road cooperative framework, are used to output the optimal control strategy through the FTD3 algorithm.

Step 3. The FTD3 algorithm is built, and the FTD3 algorithm is composed of RL module and FL module. The RL module is formed by the elements (S, A, P, R, $\gamma$) in the Markov problem, and the FL module is formed by the network parameter module and the aggregation module. In addition to the actor network and two critic networks, each agent also has its target network, for a total of six neural networks.

Step 4. Interactive training is performed in the simulation environment. The training process includes two stages: exploration and sample learning. In the exploration stage, the strategy noise of the algorithm is used to generate random actions. Throughout the training process, the cooperative state matrices are captured and synthesized by the vehicle-road cooperation framework, and then the FTD3 algorithm takes the matrices as the input and outputs an action with noise. After the action is executed, the new state matrices are captured by the vehicle-road cooperative framework, and the action is evaluated by the reward function module. This tuple consisting of state matrices, action, next state matrices and reward function is experience. And the randomly generated experience samples are stored in the replay buffer. When the number of experience samples exceeds 3000, the training enters the sample learning stage. Take samples from the replay buffer with minibatch and learn according to the training method of the FTD3 network training module. As the learning level increases, the noise of the policy is attenuated.

Step 5. Each neural network parameter is obtained by the network parameter module in the FL module, and the parameters are uploaded to the aggregation module of the RSU. The aggregation module is used to aggregate the shared model parameters by averaging the neural network parameters uploaded by the network parameter module according to the aggregation interval;

Step 6. The network parameter module in the FL module, the parameter of the aggregated shared model is distributed to the agents for local update, and the cycle continues until the network converges.

Preferably, in step 2, the cooperative state is composed of the cooperative state matrix of (56*56*1) and the sensor information matrix of (3*1).

Preferably, in step 3, the neural network model structure used by the actor network in the FTD3 algorithm is composed of 1 convolutional layer and 4 fully connected layers. Except for the last layer of the network uses the tanh activation function to map the output to the [−1, 1] interval, the other layers use the relu activation function. The critic network also uses 1 convolutional layer and 4 fully connected layers. Except for the last layer, the network does not use ab activation function to output the Q-value directly for evaluation, and the other layers use the relu activation function.

Preferably, in step 4, in the process of training the network, the learning rate selected for the actor and critic networks is 0.0001; the standard deviation of the policy noise is 0.2; the delay update frequency is 2; the discount factor $\gamma$ is 0.95; the target network update weight tau is 0.995.

Preferably, in step 4, the maximum capacity of the replay buffer is 10000; the minibatch extracted from the replay buffer is 128.

Preferably, in step 5, the neural network used by the RSU participates in aggregation but does not participate in training; only specific neural networks (actor network, target actor network, target critic network with smaller Q-values) are selected to participate in aggregation. For example, when selecting the target critic network, if the sample extraction minibatch is 128, the two critic target networks each evaluate 128 samples. If the number of samples with smaller Q-values exceeds 64, the corresponding reviewer target network is selected to participate in the aggregation.

The present disclosure has beneficial effects as follows:

(1) The present disclosure uses a vehicle-road cooperative control framework based on the RSU static processing module and the vehicle-based dynamic processing module. To address the feature extraction, an innovative cooperative state matrix is constructed by road-end advantage to reduce the training difficulty. The framework is built to guide the training through the RSU advantage and realize the cooperative sensing, training, and evaluation, at the same time. By using the system, the cooperative vehicle-road control is implemented in practice.

(2) The present disclosure uses the proposed FTD3 algorithm to improve the existing technical problems from several aspects. For user privacy, FTD3 only transmits neural network parameters instead of vehicle samples to protect privacy. For communication cost, FTD3 selects only specific networks for aggregation to reduce communication cost. To solve the problem of overestimation, FTD3 only aggregates neural networks with smaller Q-values. Unlike the hardwired FL and RL, FTD3 realizes the deep combination.

DETAILED DESCRIPTION OF THE EMBODIMENTS

The technical solution of the present disclosure is described in detail below in conjunction with the drawings, but is not limited to the contents of the present disclosure.

Figure 1:
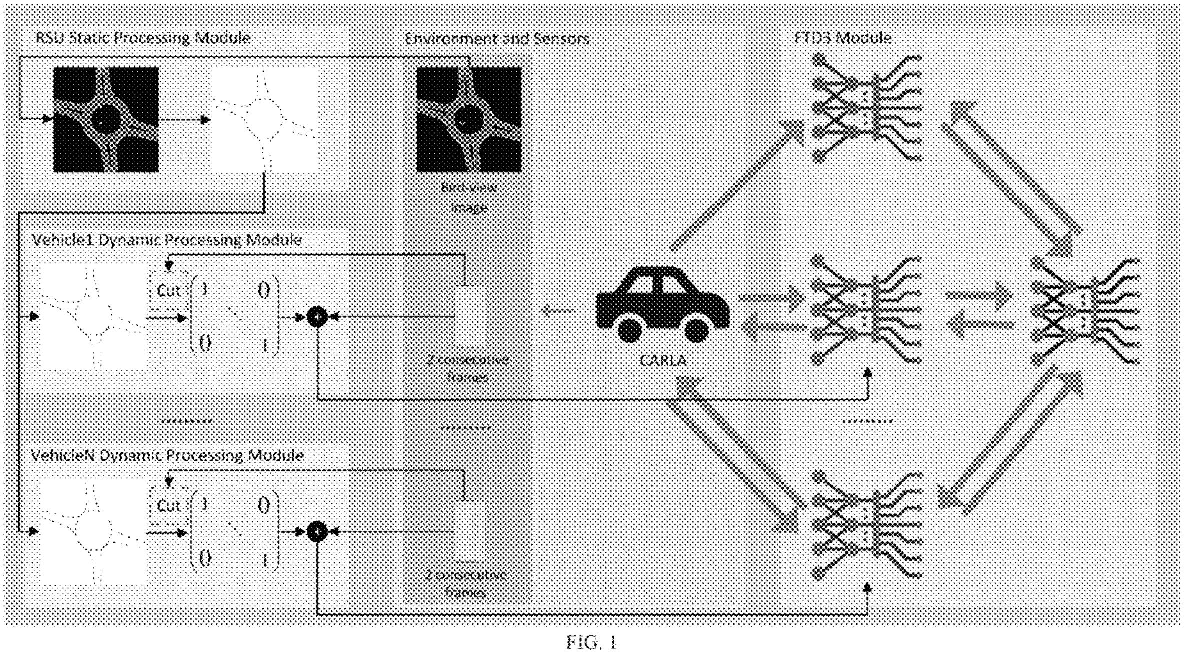
FIG. 1 is the FRL-based vehicle-road cooperative control framework proposed.
Figure 2:
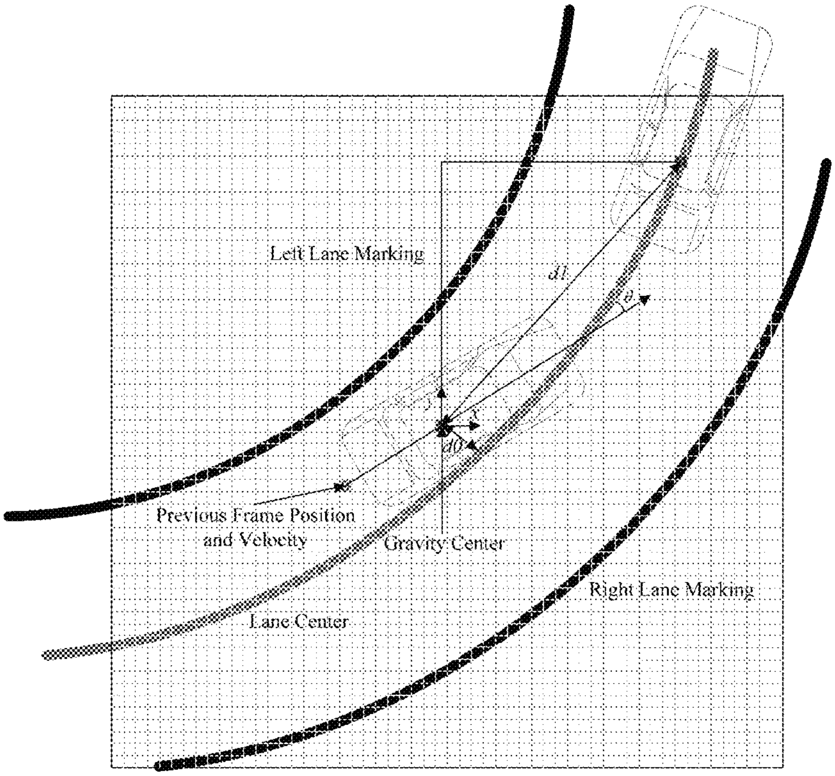
FIG. 2 is the schematic diagram of cooperative perception.

The present disclosure provides a vehicle-road cooperative control framework and FTD3 algorithm based on FRL. The proposed vehicle-road cooperative control framework and FTD3 algorithm realize the multi-vehicle control of the roundabout scenario, specifically including the following steps:

The present disclosure provides a vehicle-road cooperative control framework and FTD3 algorithm based on FRL. The proposed vehicle-road cooperative control framework and FTD3 algorithm realize the multi-vehicle control of the roundabout scenario, specifically including the following steps:

(1) A vehicle-road cooperative control framework is built in the CARLA simulator, as shown in FIG. 1, including RSU with camera and intelligent vehicles with multi-sensors. The RSU static processing module and the vehicle-based dynamic processing module are initialized to build cooperative perception, as shown in FIG. 2. Sensors are used to obtain the vehicle dynamic states, as well as collision and lane invasion events. The GNSS sensor is used to obtain vehicle location data, while the velocity information is obtained by evaluating the transposition/rotation between two consecutive frames. The IMU sensor is used to obtain vehicle acceleration and orientation information.

Figure 3:
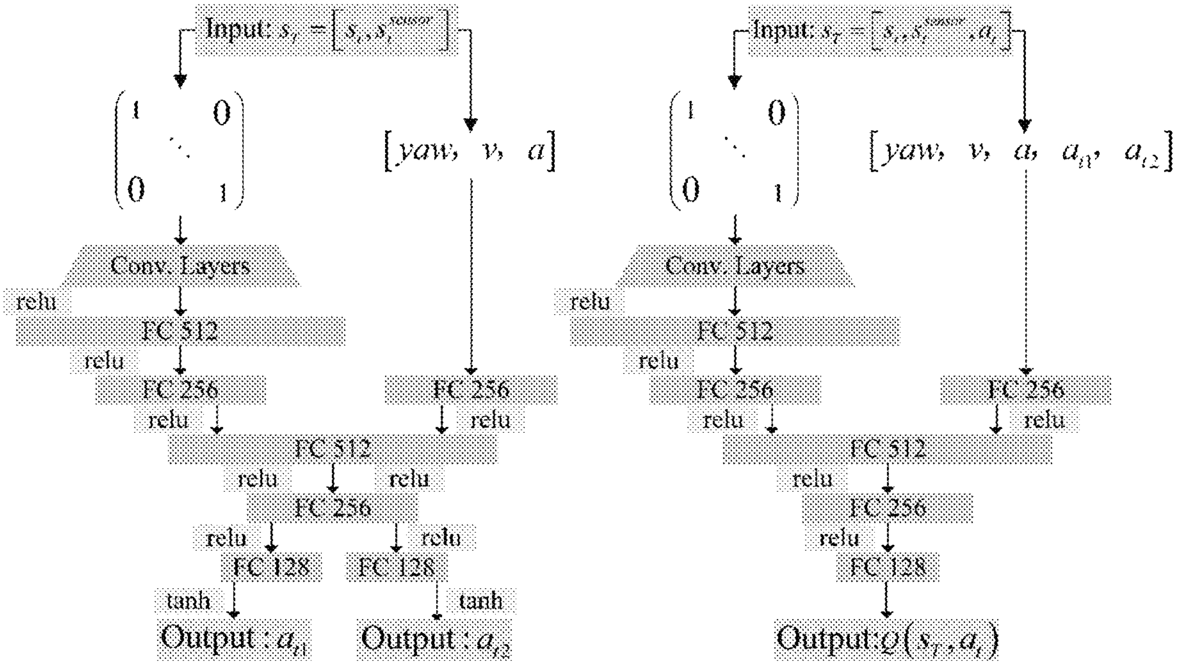
FIG. 3 shows the structure of actor and critic networks used in the present disclosure.

(2) The FTD3 algorithm is built, and neural networks are distributed to agents, as shown in FIG. 3. The input, output, and reward functions of the network are set according to the algorithm. The input corresponds to the cooperative state matrix, consists of two-part matrices. First, the cooperative perception matrix obtained by the proposed vehicle-based dynamic processing module. In addition to the static road information, dynamic vehicle speed, and location information, the matrix also includes implicit information, such as vehicle acceleration distance from the lane centerline, direction of travel and heading angle deviation. Second, the current sensor information matrix includes the speed, orientation and acceleration information obtained and calculated by the vehicle sensors. Convolutional layers and fully connected layers are used to integrate features for both matrices.

The output is combined with the vehicle control method in CARLA simulator, and the output layer of the neural network module is mapped to [−1, 1] by tanh activation function, as shown in FIG. 1, $a_{t1}$ represents the steering wheel control matrix in CARLA simulator, while $a_{t2}$ is split into [−1, 0], [0, 1], representing brake and throttle control matrices, respectively.

(3) The reward function is set based on both lateral distance related reward function and longitudinal speed related reward function considerations, to judge the performance of the action.

$$r=r_{lateral}+r_{longitudinal}$$

The first is the lateral reward function setting:

$$r1_{lateral}=-\log_{1.1}(|d0|+1)$$

$$r2_{lateral}=-10*|\sin(\text{radians}(\theta))|$$

$$r_{lateral}=r1_{lateral}+r2_{lateral}$$

The second is the longitudinal reward function setting:

$$x=\begin{cases}\frac{d_{min}}{v_{ego}}, & \text{if } d_{min}\le 14\\ 1, & \text{if } d_{min}>14\end{cases}$$

$$r1_{longitudinal}=-5+\sqrt{5^2(1-(x-1)^2)}$$

$$r2_{longitudinal}=-|v_{ego}-9|$$

$$r_{longitudinal}=r1_{longitudinal}+r2_{longitudinal}$$

Where, d0 denotes the minimum distance from the self-vehicle to the centerline of the lane, $\theta$ is the deviation of the heading angle of the self-vehicle, $d_{min}$ defines the minimum distance from the self-vehicle to the other vehicle, while $v_{ego}$ represents the speed of the self-vehicle at the current moment. d0 and $d_{min}$ are calculated from the Euclidean distances of the elements in the matrix:

$$d0=\min(\|a_{28,28}-b_{center\ line}\|^2)$$

$$d_{min}=\min(\|a_{28,28}-b_{x,y}\|^2)$$

Where, $b_{centerline}$ is the lane centerline position in the cooperative perception matrix and $b_{x,y}$ denotes the other vehicle gravity positions in the cooperative perception matrix.

(4) The random position and initial speed are obtained based on the OpenDD real driving data set, combined with the random noise. Thus, the RL agent generates experiences while interacting with the simulation environment. The generated experiences are stored in the replay buffer.

(5) The samples of the minibatch are extracted from the replay buffer after the buffer is filled to train the network using the gradient descent method. The following set of parameters are selected; the learning rate selected for the actor and critic networks is 0.0001; the standard deviation of the policy noise is 0.2; the delay update frequency is 2; the discount factor γ is 0.95, the target network update weight tat is 0.995; the maximum capacity of the replay buffer is 10000; the minibatch extracted from the replay buffer is 128. According to the learning and updating procedure, sampling from the replay buffer is performed according to minibatch, and y is calculated as follows:

$$\tilde{a}\leftarrow\pi_{\theta^{\mu'}}(s')+\epsilon,\epsilon\sim\text{clip}(\mathcal{N}(0,\tilde{\sigma}),-c,c)$$

$$y \leftarrow r + \gamma \min_{l=1,2} Q_{\theta'_l}(s', \tilde{a})$$

Where, r denotes the instant reward, γ denotes the discount factor, $$\min_{l=1,2} Q_{\theta'_l}(s', \tilde{a})$$

is the smaller value obtained by executing action ã, ã is the output of the target actor network $\mu'(s'|\theta^{\mu'})$ under the state s', $\theta^{\mu'}$ defines the parameter of target actor network, $\theta'_l$ represents the parameter of target critic networks. The Critic network is then updated by minimizing the loss:

$$\theta_l \leftarrow \text{argmin}_{\theta_l} \frac{1}{N} \sum (y - Q_{\theta_l}(s, a))^2$$

Where, N is the minibatch size, y denotes the target, $Q_{\theta_l}(s, a)$ defines the value obtained by executing action a, a is the output of the strategy π under the state s, $\theta_l$ represents the parameter of critic network. After a certain delay, the Actor network is updated, using the deterministic policy gradient.

$$\nabla_{\theta^\mu} J(\theta^\mu) = \frac{1}{N} \sum \nabla_a Q_{\theta_1}(s, a)\Big|_{a=\pi_{\theta^\mu}(s)} \nabla_{\theta^\mu} \pi_{\theta^\mu}(s)$$

Where, N is the minibatch size, $\nabla_a Q_1(s, a)$ denotes the partial derivative of $Q\theta_1(s, a)$ to a, $\nabla_{\theta^\mu}\pi_{\theta^\mu}(s)$ denotes the partial derivative of $\pi_{\theta^\mu}(s)$ to $\theta^\mu$, $\pi_{\theta^\mu}(s)$ defines the actor network, $\theta^\mu$ represents the parameter of actor network. Finally, using a soft update, the target network is updated as follows:

$$\theta'_l\leftarrow\tau\theta_l+(1-\tau)\theta'_l$$

$$\theta^{\mu'}\leftarrow\tau\theta^{\mu}+(1-\tau)\theta^{\mu'}$$

Figure 4:
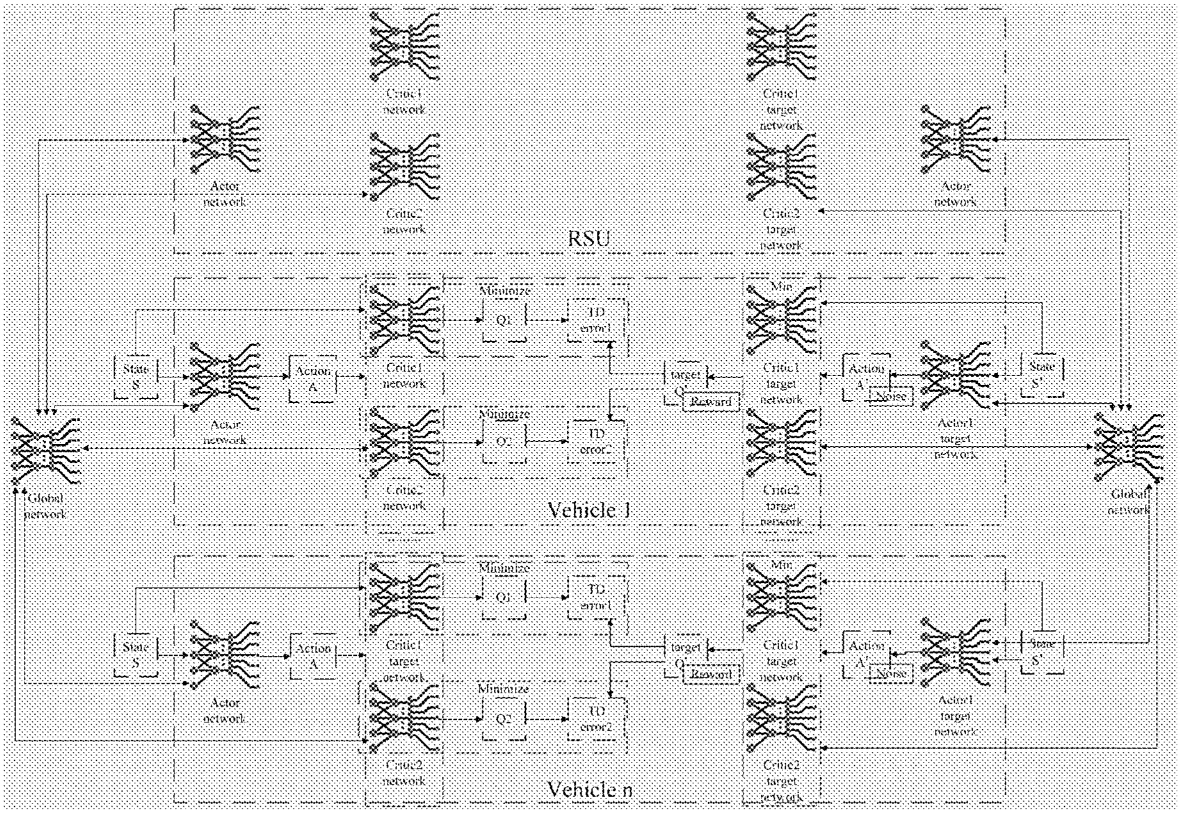
FIG. 4 is the FTD3 framework.

Where, τ is the soft update parameter. With a certain aggregation interval, the network parameter module selects the parameters of some networks (actor networks, target actor networks, and target critic networks with smaller Q-values) and sends parameters to the aggregation module for aggregation to generate a sharing model, as shown in FIG. 4. Then, distributes the shared model parameters to the agents for local update. The specific algorithm flow is shown below:

Algorithm 1: FTD3 algorithm

```
for v ∈ Agents do
  Randomly initialize critic1 network Q1(s, a | θ)_i, critic2 network Q2(s, a |
  θ)_i, actor network μ(s | θ)_i with weights θ_{1,i}, θ_{2,i}, θ_i^μ;
  Initialize target network Q1'_i, Q2'_i, μ'_i with weights θ_{1,i}' ← θ_{1,i}, θ_{2,i}' ←
θ_{2,i}, θ_i^{μ'} ← θ_i^μ;
  if v ∈ vehicles then
    Initialize replay buffer R_i;
  end if
end for
for episode = 1, M do
  Initialize a random process N with extra space noise for action exploration
  for t = 1, 2 do
    Stack s_t^sensor = [yaw, v, a] from vehicle sensors as s_t^dynamic;
  end for
  for t = 3, N do
    for v ∈ vehicles do
      Observe s_{t,i} from vehicle-based Dynamic Processing Module as
```

$$s_{t,i} = s_{t,i}^{static} + s_{t,i}^{dynamic}, \text{ and } s_{T,i} = [s_{t,i}, s_{t,i}^{sensor}];$$

```
      Select action a_{t,i} = μ(s_{T,i} | θ_i^μ)_i + ε, ε~N(0, σ²I) and observe
        reward r_{t,i} and observe new states
```

$$s_{t+1}^{sensor}, s_{t+1,i}^{static}, s_{t+1,i}^{dynamic}, \text{ and } s_{T+1,i}, = [s_{T+1,i}, s_{t+1,i}^{sensor}];$$

-continued

Algorithm 1: FTD3 algorithm

Store transition ($s_{T,i}$, $a_{t,i}$, $r_{t,i}$, $s_{T+1,i}$) in $R_i$;
end for
if $R_1$.size >= 3000:
for v ϵ vehicles do
Sample a random minibatch of N transitions ($s_T$, $a_t$, $r_t$, $s_{T+1}$) from $R_i$;

$$\tilde{a}_i \leftarrow \pi_{\theta_i^{\mu}}, (s_T) + \epsilon,\ \epsilon \sim \text{clip}(\mathcal{N}(0, \tilde{\sigma}), -c, c),\ y \leftarrow r_t + \gamma \min_{l=1,2} Q_{\theta'_{l,i}}(s_{T+1}, \tilde{a}_i);$$

$$\text{Update critics: } \theta_{l,i} \leftarrow \min_{\theta_{l,i}} N^{-1} \sum \left(y - Q_{\theta_{l,i}}(s_T, a_t)\right)^2;$$

if t mod b then
Update the actor policy using the sampled policy gradient:

$$\nabla_{\theta_i^{\mu}} J(\theta_i^{\mu}) = N^{-1} \sum\nolimits_{a_t}^{\nabla} Q_{\theta_{1,i}}(s_T, a_t)|_{a_t = \pi_{\theta_i^{\mu}}(S_T)} \nabla_{\theta_i^{\mu}} \pi_{\theta_i^{\mu}}(s_T)$$

Update the target networks:
$\theta'_{1,i} \leftarrow \tau\theta_{1,i} + (1 - \tau)\theta'_{1,i}$
$\theta'_{2,i} \leftarrow \tau\theta_{2,i} + (1 - \tau)\theta'_{2,i}$
$\theta'^{\mu}_i \leftarrow \tau\theta_i^{\mu} + (1 - \tau)\theta'^{\mu}_i$
end if
end for
if t mod Agg Per then
Append all weights of $\theta_{2,i}$, Min( $\theta_{1,i}'$, $\theta_{2,i}'$ ), $\theta_i^{\mu}$, $\theta_i^{\mu'}$ to weights_list,
global_weights_list ← Global_update(weights_list);
Updata weights $\theta_{2,i}$, Min( $\theta_{1,i}'$, $\theta_{2,i}'$), $\theta_i^{\mu}$, $\theta_i^{\mu'}$ using global weights;
end if
end if
end for For the initialization process, $Q1(s, a|\theta)_i$, $Q2(s, a|\theta)_i$, $\mu(s|\theta)_i$ are the two critic networks and one actor network of the ith agent, $\theta_{1,i}$, $\theta_{2,i}$, $\theta_i^{\mu}$ define the parameter of networks, respectively. $Q1'_i$, $Q2'_i$, $\mu'_i$ are the target networks of the ith agent, $\theta_{1,i}'$, $\theta_{2,i}'$, $\theta_i^{\mu'}$ denote the parameter of networks, respectively. $R_i$ represent the replay buffer of the ith agent. $s_{T,i}=[s_{t,i}, s_{t,i}^{sensor}]$ is the cooperative state matrix of the i th agent, where $s_{t,i}=s_{t,i}^{static}+s_{t,i}^{dynamic}$ define the cooperative perception matrix of the ith agent, $s_{t,i}^{static}$ represents the static information obtained by the RSU static processing module of the ith agent, $s_{t,i}^{dynamic}$ denotes the dynamic information obtained by the vehicle-based dynamic processing module of the ith agent, $s_{t,i}^{sensor}$=[yaw, v, a] is sensor information matrix, consist of heading angle yaw, velocity v, accelerate a. For action output, $\pi_{\theta_i^{\mu}}(s_T)$ defines the strategy of target actor network of the ith agent, $\epsilon \sim$clip ( $\mathcal{N}(\theta,\tilde{\sigma})$, −c, c) represents the normal distribution noise between constants −c and c, ã denotes the action output after noise, r denotes the instant reward, γ is the discount factor, $$\min_{l=1,2} Q_{\theta'_{l,i}}(s_{T+1}, \tilde{a}_i)$$

defines the smaller value obtained by executing action ã of the ith agent under state $s_{T+1}$. For critic network updates, N is the minibatch size, $Q_{\theta_{l,i}}((s_T, a_t)$ denotes the value obtained by executing action $a_t$, $a_t$ denotes the output of the strategy π under the state $s_T$. For actor network updates, N denotes the minibatch size, $\nabla_{\theta_i^{\mu}} J(\theta_i^{\mu})$ defines the gradient, $\nabla_{a_t} Q_{\theta_{1,i}}(s_T, a_t)$ represents the partial derivative of $Q_{\theta_{1,i}}(s_T, a_t)$ to $a_t$, $\nabla_{\theta_i^{\mu}} \pi_{\theta_i^{\mu}}(s_T)$ denotes the partial derivative of $\pi_{\theta_i^{\mu}}(s_T)$ to $\theta_i^{\mu}$. For soft update, τ is the soft update parameter.

The description of the specific process, random initialization of the neural network and replay buffer of the agent. When the sample of the buffer is less than 3000, it will enter the random exploration stage. The vehicle dynamic information is obtained from the vehicle sensors, while the static road information is obtained from the RSU static processing module. The road information is cut into a 56×56 matrix with the center of gravity of the intelligent vehicle implementing the vehicle-based dynamic processing module. Then, the matrix and sensor information of two consecutive frames are stacked to synthesize the cooperative state matrix. The neural network module is used to output the steering wheel and throttle control quantity with normal distribution noise according to the cooperative state matrix, and finally the control quantity is handed over to the CARLA simulation environment for execution. In the next step, the vehicle dynamic information is obtained from the vehicle sensors, while the static road information is obtained from the RSU static processing module. By using the vehicle-based dynamic processing module, the road information is cut into a 56×56 matrix. Then, the matrix and sensor information of two consecutive frames are stacked to generate the next moment cooperative state matrix. The next moment cooperative state matrix is used by the reward function module to output the specific reward value. The cooperative state matrix, control quantity, reward, and next moment cooperative state matrix is stored in the replay buffer as a tuple. When there are more than 3000 experiences in the buffer, the normal distribution noise begins to attenuate and the training stage is entered. Minibatches of samples are extracted from the replay buffer to train the actor-critic network by the gradient descent method, while other networks are updated by the soft update method. The network parameter module is first used to obtain and upload the neural network parameters before aggregation; and after aggregation, it is used to obtain the shared model parameters and distribute the parameters to the agents for local update. This process loops until the network converges.

(6) Feasibility analysis; The proposed control method based on FTD3 algorithm still play its performance even with communication delay. This is mainly due to the algorithm characteristics of transmitting only neural network parameters and the algorithm setting of selecting specific networks to participate in aggregation. These advantages reduce the communication requirements, and facilitate the implementation in the existing Wi-Fi and 4G environment with broader application.

In summary, the present disclosure uses a vehicle-road cooperative control framework based on the RSU static processing module and the vehicle-based dynamic processing module. An innovative cooperative state matrix and reward function are constructed by the RSU advantage, and realize the cooperative sensing, training and evaluation at the same time. By using the system, the cooperative vehicle-road control can be implemented in practice. Moreover, the proposed FTD3 algorithm realizes the deep combination of FL and RL, and improves the performance from 3 aspects. First, RSU neural network participates in aggregation instead of training, and FTD3 only transmits neural network parameters to protect privacy and prevent the difference of neural networks from being eliminated too quickly: Second, FTD3 selects only specific networks for aggregation to reduce the communication cost; Third, FTD3 aggregates only target critic networks with smaller Q-values to further prevent overestimation. Unlike the hardwired FL and RL, FTD3 realizes the deep combination.

A serious of detailed descriptions above are only specific descriptions of the practicable mode of implementation of the present disclosure and are not intended to limit the scope of protection of the present disclosure. Any equivalent mode or modification that does not depart from the technology of the present disclosure is included in the scope of protection of the present disclosure.

What is claimed is:

1. A vehicle-road cooperative control method based on multi-intelligence federated reinforcement learning (FRL) at a complex intersection, comprising the following steps:

step 1. a vehicle-road cooperative framework is constructed in a simulation environment, in the vehicle-road cooperative framework, a road side unit (RSU) static processing module and a vehicle-based dynamic processing module are used to synthesize a cooperative state matrix for reinforcement learning (RL), wherein the RSU comprises a camera, and RSU bird-view information is distinguished into static information (road information, lane information, lane centerline information) and dynamic information (a plurality of intelligent connected vehicles) by using the RSU static processing module, wherein the lane centerline information in the static information is used as a basis for the cooperative state matrix of RL, while the dynamic information is used as a basis for cooperative state matrix cropping, the vehicle-based dynamic processing module is used to crop a static matrix obtained by the RSU static processing module, based on vehicle location information and a coordinate transformation, a cropped 56×56 cooperative state matrix is then used as a sensing area of a single vehicle, covering a physical space of about 14 m×14 m, the dynamic information is stacked in two consecutive frames to obtain more comprehensive dynamic information, the dynamic processing module is used to superimpose the cropped static matrix and the stacked dynamic information to synthesize the cooperative state matrix for a Federated Twin Delayed Deep Deterministic policy gradient (FTD3) algorithm;

step 2. the control method is described as a Markov decision process, the Markov decision process consists of a set of tuples (S, A, P, R, γ) description, wherein:

S denotes a set of state, corresponding to a cooperative state output by the vehicle-road cooperative framework, the cooperative state consists of two-part matrices, first, a cooperative perception matrix obtained by the vehicle-based dynamic processing module, in addition to the static road information, a dynamic vehicle speed, and orientation information, the cooperative perception matrix also includes implicit information, such as vehicle acceleration information, a distance from the lane centerline, a direction of travel and a heading angle deviation, a plurality of convolutional layers and fully connected layers are used to integrate features, second, a current sensor information matrix includes speed information, the orientation information, and the acceleration information obtained and computed by a plurality of vehicle sensors;

A is a set of action, corresponds to a throttle of the vehicle and a steering wheel control quantity;

P denotes a state transition equation P: S×A→P(S), for each state-action pair (s, a)∈S×A, there is a probability distribution p (•|s, a) indicating a possibility of entering a new state after an action a is taken under a state s;

R defines a reward function R: S×S×A→R, R ($s_{t+1}$, $s_t$, $a_t$) denotes a reward obtained after moving from an original state $s_t$ to a new state $s_{t+1}$, the reward function is used to evaluate the action;

γ represents a discount factor, γ∈[0, 1], used to compute a cumulative reward $$\eta(\pi_\theta) = \sum_{i=0}^{T} \gamma^i r_i,$$

a solution to the Markov decision process is to find an optimal control strategy π: S→A, to maximizes the cumulative reward $\pi^*: = \mathrm{argmax}_\theta \eta(\pi_\theta)$, the cooperative state matrix obtained by the vehicle-road cooperative framework is used to output the optimal control strategy through the FTD3 algorithm;

step 3. the FTD3 algorithm is built, and the FTD3 algorithm is composed of an RL module and a federated learning (FL) module, the RL module is formed by the set of tuples (S, A, P, R, γ) in the Markov decision process, and the FL module is formed by a network parameter module and an aggregation module;

step 4. interactive training is performed in the simulation environment, a training process includes two stages: an exploration stage and a sample learning stage, in the exploration stage, a strategy noise of the FTD3 algorithm is used to generate a random action, throughout the training process, the cooperative state matrix is captured and synthesized by the vehicle-road cooperation framework, and then the FTD3 algorithm takes the cooperative state matrix as an input and outputs the action with the strategy noise, after the action is executed, a new state matrix is captured by the vehicle-road cooperative framework, and the action is evaluated by a reward function module, the set of tuples consisting of the cooperative state matrices, the action, the new state matrix, and the reward function is an experience, and randomly generated experiences are stored in a replay buffer, wait until the number of experiences meets a certain condition, the training process will enter the sample learning stage, sample from the replay buffer with a minibatch and learn according to a FTD3 network training module, as a learning level increases, the strategy noise is attenuated;

step 5. a plurality of neural network parameters are obtained by the network parameter module in the FL module, and the neural network parameters are uploaded to the aggregation module of the RSU, the aggregation module is used to aggregate a shared model parameter by averaging the neural network parameters uploaded by the network parameter module according to an aggregation interval method, wherein only specific neural networks are selected by the FTD3 algorithm to participate in the aggregation; and step 6. by using the network parameter module in the FL module, the aggregated shared model parameter is distributed to the intelligent connected vehicles for local update, the training process loops until the network converges.

2. The vehicle-road cooperative control method based on multi-intelligence FRL at a complex intersection according to claim 1, wherein in step 2, the cooperative state is composed of the cooperative state matrix of (56*56*1) and a sensor information matrix of (3*1).

3. The vehicle-road cooperative control method based on multi-intelligence FRL at a complex intersection according to claim 1, wherein in step 3, a neural network model structure used by an actor network in the RL module of the FTD3 algorithm is composed of 1 convolutional layer and 4 fully connected layers, except for the last layer of the network uses a tanh activation function to map an output to a [−1, 1] interval, the other layers use a relu activation function, a critic network also uses 1 convolutional layer and 4 fully connected layers, except for the last layer, the network does not use an activation function to output a Q-value directly for evaluation, and the other layers use the relu activation function.

4. The vehicle-road cooperative control method based on multi-intelligence FRL at a complex intersection according to claim 1, wherein in step 4, a learning rate selected for an actor network and a critic network during the network training process is 0.0001; a strategy noise standard deviation is 0.2; a delay update frequency is 2; the discount factor $\gamma$ is 0.95; a target network update weight tau is 0.995; a maximum capacity of the replay buffer is 10000; the minibatch extracted from the replay buffer is 128.

5. The vehicle-road cooperative control method based on multi-intelligence FRL at a complex intersection according to claim 1, wherein in step 5, six neural networks used by the RSU participate in aggregation instead of training.

* * * * *